Aug. 16, 1966 J. P. MALLOY 3,267,190
METHOD OF MAKING STORAGE BATTERY ELECTRODES
Filed April 12, 1965 2 Sheets-Sheet 1

3,267,190
METHOD OF MAKING STORAGE BATTERY ELECTRODES

James P. Malloy, Cheltenham, Pa., assignor to The Electric Storage Battery Company, a corporation of New Jersey
Filed Apr. 12, 1965, Ser. No. 447,442
4 Claims. (Cl. 264—137)

This application is a continuation-in-part of U.S. patent application Serial No. 133,353, now abandoned, filed August 23, 1961.

The present invention generally relates to an improvement in lead-acid storage batteries of the type having spaced pencils of active material mounted on metal spines which extend between top and bottom bars, and which are surrounded with an insulating sheath or tube adapted to secure the active material to the individual spines. More specifically, the present invention is concerned with a new and improved insulating tube for electrodes of the type described which is adapted to provide improved electrode performance and life, and a method for making a new and improved insulating tube.

Heretofore, electrode active material retaining tubes have been made of slotted ebonite or a thermoplastic material such as polyethylene. In an effort to provide electrodes of improved electrical performance and of a lower cost, however, it has been proposed to utilize tubes woven of glass or synthetic resins. Tubes of this type have been woven, knitted, or braided individually, and rows of tubes have been produced in a single weaving or like operation with individual tubes being interconnected by a small width of fabric. Such prior art fabric tubing, however, has not proven to be satisfactory either from a production or performance standpoint. For example, it has been found that such tubing lacks the stiffness necessary for efficient filling with active material. To overcome this, it has been proposed to either enclose the fabric tubing with an outer supporting tube of a stiffer material, such as slotted ebonite, or to impregnate the tubing with a natural or a synthetic resin which upon curing stiffens to the degree necessary to impart to the tubing the desired rigidity. This of course, adds to the cost of such tubing and reduces its electrical efficiency. In performance, it has been found that fabric tubing made from synthetic resin fibers has failed to have the chemical resistance necessary to withstand the strong corrosive environment inherent in battery operation. Fabric tubing woven of glass has been found to lack the mechanical strength to withstand the repeated expansion and contraction which attends electrode charging and discharging.

An object of the invention is to provide an improved method for making a glass fiber retaining tube which is impregnated with a phenolic resin.

Other objects and purposes of this invention will be apparent to those skilled in the art in view of the following description, and with particular reference to the drawings in which.

Figure 1:
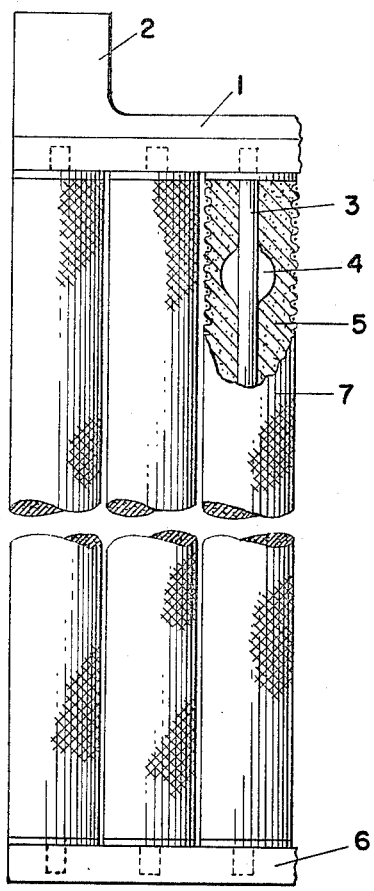
FIGURE 1 is a front view of a part of a tubular type storage battery electrode with a portion of one tube shown in cross-section.

The strength-to-weight ratio of fiber glass is unequaled by any other material, provided the surface of the fibers has not been abraded. Strengths up to almost one million pounds per square inch have been measured. However, the slightest contact, particularly contact with the surface of another fiber, greatly weakens the glass. For this reason, lubricants are usually sprayed on the fibers as they are formed. While such lubricants impart to the fiber glass sufficient abrasion resistance to withstand the weaving operation, these lubricants will not withstand the corrosive environment of a battery, and hence, prior art glass tubing has ruptured due to the abrasion attendant the expansion and contraction that occur during cycling. Although prior art stiffening agents have provided some abrasion protection for the glass threads utilized in weaving glass fabric tubing, it has been found that such stiffening agents generally have been ineffective for there has been no attempt to prevent the individual glass filaments which make up the threads from contacting and abrading other filaments in the same thread. This causes the threads to fail from internal abrasion of their own filaments as opposed to external abrasion caused by contact with other threads.

The present invention is characterized by the thorough impregnation of the glass threads of active material retainer tubes so that the individual glass filaments in each thread are coated with a film of acid-resistant material which separates the filaments from each other or bonds them so as to prevent motion of one filament against another, and thereby protects the threads from internal as well as external abrasion. In this respect, the glass threads utilized in the manufacture of tubing in accordance with the present invention are preferably made from continuous monofilaments of chemical grade glass twisted into threads as contrasted with staple or discontinuous filament yarns.

Continuous monofilament type thread is preferred because it exhibits substantially greater strength, providing finished fabric tubing having a burst strength of over 600 p.s.i. Also, in accordance with the present invention, the active material retaining tubes are preferably braided as opposed to being woven or knitted in order that the glass thread be subjected to a minimum of abrasive action prior to its impregnation with the acid-resistant material. The braided glass retaining tubes are impregnated with a phenol formaldehyde A-stage resin which is then cured in such a manner that the resin passes successively through the B-stage and finally through the C-stage.

The number of ends and picks of the glass threads are chosen so that the porosity of the finished tubing is such that air at a pressure of 3 inches of water will pass through 0.5 square inch of tubing surface at a rate of at least 15,000 cc. per minute for round tubing and at least 20,000 cc. per minute for square tubing. In this manner there is provided tubing characterized by the stiffness required for economical handling and filling, the excellent chemical resistance of glass, and the physical resistance to filament damage by both internal and external abrasion which preserves the strength inherent in glass.

Referring now to the drawings, there is shown in FIGURE 1 a battery electrode having a top bar 1 provided with a lug 2. Secured to the top bar 1 are a plurality of spines 3. As illustrated, the spines 3 lie in a row and are spaced from each other. Each spine is provided with a plurality of fins 4 for holding pencils of active material 5 or material to become battery active material in position on the spines. Provided at the bottom of the electrode is a bottom bar 6. Enclosing the pencils of active material is a sheath or retainer 7 which according to the present invention is braided glass threads.

As noted hereinbefore, the retaining sheaths 7 of the present invention are braided of chemical grade glass threads impregnated with a solution or dispersion of phenolic resin. More specifically, the threads utilized in the retaining tube 7 of the present invention are braided of glass threads comprising twisted continuous monofilaments of glass. In order to achieve the degree of porosity necessary to allow the free diffusion of battery electrolyte through the tube so as to provide efficient utilization of the active material without the loss of the active material by silting, the number of picks and ends utilized in the braided tubing are chosen so that the tube will permit the passage through 0.5 square inch of tubing surface of at least 15,000 cc. of air per minute for round tubing and at least 20,000 cc. per minute for square tubing at a pressure of 3 inches of water. By way of specific example, the braid may be chosen so as to have between 44 and 64 ends with the picks, i.e., the crossovers per inch, varying between about 14 to 20. By way of a specific example of glass thread suitable for use in the tubing 7, these threads may comprise continuous monofilaments ranging from about 0.0002 to about 0.0004 inch in diameter with approximately 200 to 250 monofilaments twisted into a single thread.

In the manufacture of glass thread of the type described, the individual continuous monofilaments are sprayed with a sizing material which acts to prevent the abrasion and splitting of the glass monofilaments during the braiding operation. This sizing coating, however, is not permanent for it is not resistant to the environment of a battery, and therefore, the glass tubing is subject to abrasion and consequent splitting in the battery due to expansion and contraction of the active material during battery operation. In addition, tubes braided of glass fabric have been found to lack sufficient rigidity to withstand the pounding operation required to force the battery active material into the retaining tubes.

It has been discovered that these problems can be overcome if the finished tubing is impregnated with a plurality of solutions of a phenolic resin. The operation is one readily adapted to mechanization, see copending application Serial No. 268,067 filed March 26, 1963, and assigned to the assignee of this application, and is accomplished by passing the tubing through one or more impregnation solutions each of which is followed by a wiping and rolling operation, the pressure of which is controlled to regulate the amount of resin applied and to assist in uniformly distributing the resin throughout the fabric. In addition, this rolling or pressing operation tends to work the resin into the individual glass filaments. The coating is thus made to penetrate into the thread to isolate the individual filaments thereof from each other and/or to bond the filaments so as to prevent motion of one filament against another. The braided glass tubing is inert in the acid environment of the battery, and so some openings in the phenolic resin coating can be tolerated, but the overall result of the coating operation must be the inhibition of relative motion of the individual fiber filaments in the threads.

The acid resistant impregnation solution is a phenol formaldehyde A-stage resin which may be prepared using a variety of commonly available phenol formaldehyde resin solutions. Generally, the solutions are prepared in water and/or alcohols, and may include a wetting agent. Particularly satisfactory results have been obtained using a coating solution comprising at least about 40% by weight of resin solids in a solution of ethanol and having a viscosity ranging from about 700 to about 850 centipoises. This solution may be applied at room temperature. A dip in such a solution for a time of approximately ten to thirty seconds has been found to be satisfactory.

Following the coating operation, the impregnated tubing is passed through a series of staggered wiping bars which wipe excess resin from the tubing. There may be 5 or 6 wiping bars which are staggered, and as the tubing passes between the bars it is flattened and the wiping bars alternately wipe one side of the tubing and then the other. This wiping operation removes the excess resin from the surface of the tubing and in addition, forces the resin between and into the threads so that the filaments comprising the threads become coated. Then the tubing is passed between a pair of pressure rollers which are power driven and which pull the tubing through the concentrated phenolic resin solution and past the wiping bars. The pressure applied by the rollers is selected to squeeze the excess resin from the glass tubing in order that the pores are not blocked by the resin and to work the resin into and around the glass filaments. In general it has been found that a force of about 15 lbs. applied to the rollers, i.e. a 15 lb. force is required to separate the rollers, is sufficient. In some instances it may be necessary to pass the tubing through the rollers more than once. The resin coating should amount to at least about 15% by weight of the glass while still retaining the necessary porosity.

After the wiping and squeezing, the impregnated glass tubing may be moved directly onto a forming mandrel having the cross-section contour of the tubing to be produced. The tubing may be driven onto the mandrel automatically by means of a power-driven roller shaped to the contour of the mandrel. While still on the forming mandrel, the impregnated glass tubing is heated to a temperature of approximately 500° F. to cure the phenolic resin to its B-stage. This may be carried out by means of infra-red lamps, but the tube should be removed from the mandrel before the cure is complete. The tube is removed shortly after all of the volatile solvents have been driven off, which generally requires about 0.5 to 1 minute, and the cure has imparted to the tubing sufficient rigidity to retain the shape of the forming mandrel. If the tube is allowed to fully cure on the mandrel before removal, it adheres to the mandrel and is difficult to remove without damaging the resin bonds holding the threads. The damage occurs where the threads cross one another, resulting in weakening of the tube. As the glass tubing leaves the mandrel, it may be cut to the desired length by means of a guillotine-type cutter.

Then the electrode-size glass tubes are immersed in a dilute solution of phenolic resin, containing from about 10 to about 15% by weight of resin solids. After immersion for at least about 5 seconds, the impregnated tube is placed on end and allowed to drain for approximately 5 minutes, after which it is placed in an oven to complete the curing of the phenolic resin to its C-stage. This curing operation can be carried out at a temperature of about 400° F. After the phenolic resin impregnated glass tube has been in the oven for about ⅓ to about ½ the total time required for a complete cure, it is withdrawn from the oven and again immersed for a minimum of 5 seconds in a dilute phenolic resin solution, containing from about 10 to about 15% by weight of resin solids. Thereafter, the tube is allowed to drain for about 5 minutes and then returned to the oven to complete the cure which requires about 10 to 15 minutes at 400° F.

The three impregnating treatments as described hereinbefore, the first in a concentrated phenolic resin solution and two subsequent impregnations with dilute solutions, provide the glass tube with a phenolic resin coating amounting to from about 15% to about 30% by weight of the glass. It has been found that the second impregnation of the glass tube with a dilute phenolic resin solution is essential, for otherwise, the glass tube does not have sufficient strength to withstand the pounding operation required to force the active material into the retaining tube.

Figure 2:
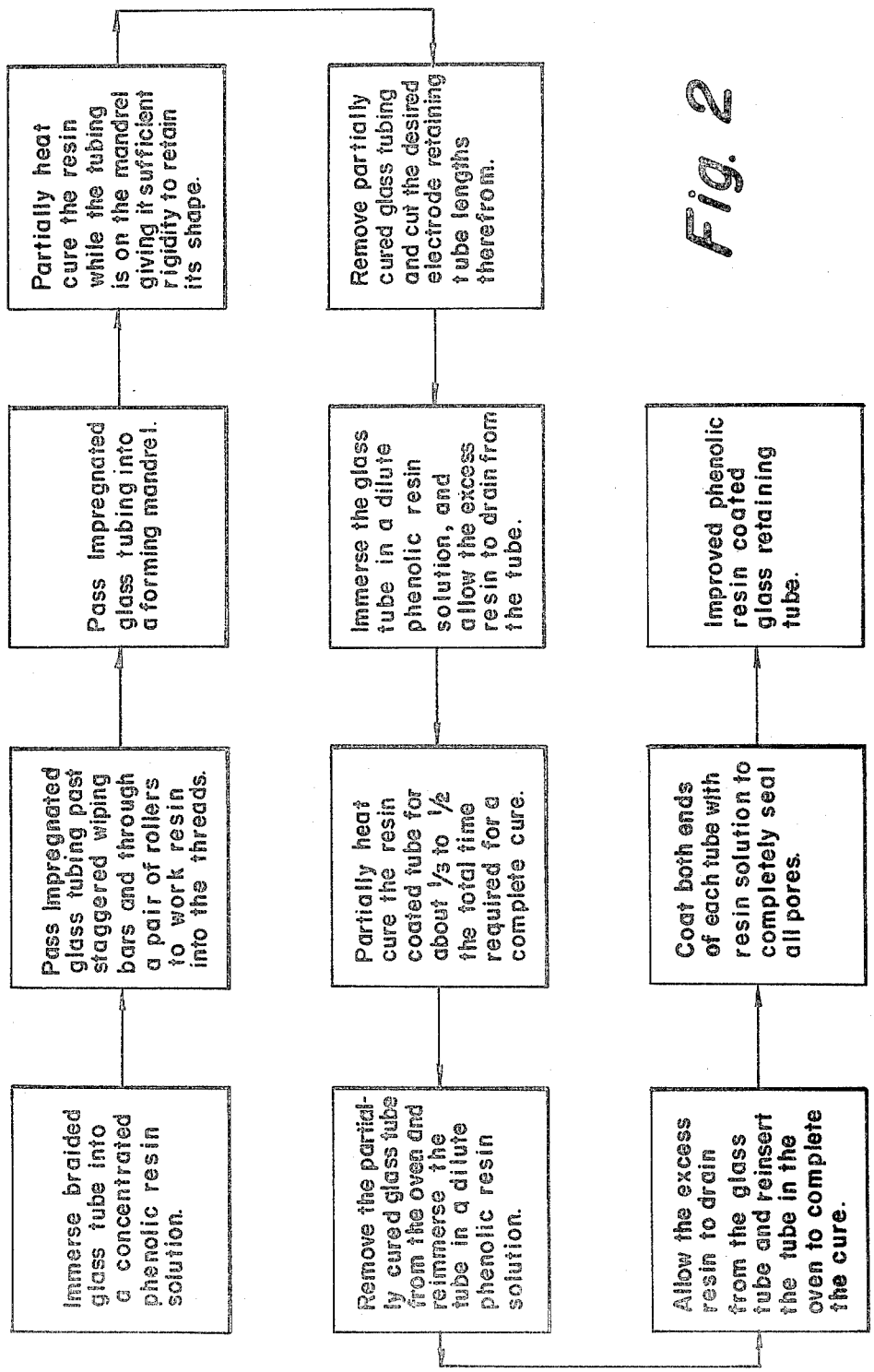
FIGURE 2 is a flow diagram of the method of this invention for making a phenolic resin impregnated glass fiber retaining tube.

A preferred embodiment of the method of this invention is illustrated in the flow diagram of FIGURE 2. Braided glass tubing with a braid of 56 ends with 16 picks was immersed in a commercially available concentrated phenolic resin solution (Bakelite Phenolic BKS-2600) containing 54% by weight of phenolic resin solids and 46% by weight of ethanol. The glass tubing was immersed in this concentrated phenolic solution for about 10 seconds and then was passed through a series of 6 staggered wiping bars. The tubing was pulled through the phenolic solution and past the wiping bars by means of pressure rollers which were 3.5 inches in diameter and had a force of 15 lbs. exerted thereon. After the tubing was squeezed by passing it through the pressure rollers, it was passed onto a 0.316 inch square forming mandrel to provide it with a square shape. The impregnated glass tubing was heated to about 400° F. for about 6 minutes, and while still on the mandrel, to partially cure it to a rigid, self-supporting structure which retained its shape when removed from the mandrel.

Since the phenolic resin was given only a partial cure, it did not adhere to the mandrel, and the glass tubing was readily removed. As it was removed from the mandrel, the glass tubing was chopped into retaining tubes having a length of 16 inches. Then the glass tubes were completely immersed for about 20 seconds in a dilute phenolic resin solution which comprised Bakelite Phenolic BKS-2600 diluted with ethanol so that it had a resin solids content of about 13% by weight. The tubes were stood on end and the excess resin was allowed to drain from the tubes for about 5 minutes. Then the impregnated glass tubes were returned to an oven and were cured at 385° F. for 4 minutes. The duration of this cure was only about ⅓ of the total time required for a complete cure.

The partially cured glass tubes were removed from the oven and were reimmersed for a second itme for about 20 seconds in the dilute phenolic resin solution containing about 13% by weight of resin solids. The tubes were again stood on end for about 5 minutes to allow the excess resin to drain therefrom, and then they were reinserted in the oven at 385° F. for about 10 minutes to complete the cure. After the phenolic resin was completely cured, both ends of each tube were coated by dipping the ends of the tubes into a 25% by weight polystyrene-toluol solution. The ends of each tube were coated to a depth of about 0.25 inch which completely sealed all pores. The purpose of this end coating is to impede the tendency of the glass threads to expand in the center of the tube and pull in from the tube ends which is caused by expansion and contraction of the active material during the operation of a battery and to prevent fraying of the ends of the tubes during plant processing.

The following example demonstrates the improvement in the strength properties of glass tubing made in accordance with this invention:

*Example*

Samples of phenolic resin impregnated glass tubes made as described above were tested for porosity and strength properties. Square tubes which were immersed once in the concentrated phenolic resin solution and twice in the dilute phenolic resin solution ("triple dip") had a porosity of 25,000 cc./min. of air per 0.5 inch of tube surface. In comparison, identical tubes which were immersed once in the concentrated phenolic solution and only once in the dilute solution ("double dip") had a porosity of 25,300 cc./min. of air per 0.5 inch of tube surface. This difference in porosity is so slight that it must be regarded as insignificant.

Samples of the "triple dip" tubes were also compared to "double dip" tubes with respect to the strength of the glass-phenolic bond. Sample tubes were cut to a 6 inch length and a 1 inch section of 0.316 square mandrel was inserted in each tube end to provide support for clamping. A sample tube was inserted in a Scott-Pulltester device and clamped securely. The Pulltester device was operated at 0.4 inch/min., and the sample tube was subjected to tensile stress until the glass-phenolic bond was broken. This is readily detected visually by a collapse, but not tear, of the tube. The pounds tensile pull required to break the glass-phenolic bond was determined for 6 samples of each tube type with the following results:

| | Lbs. tension to rupture glass-phenolic bond |
|---|---|
| Double dip tube | 20 |
| Triple dip tube | 38 |

It is evident that the triple dip tube had a greatly increased tensile strength. Since the double dip tube does not have sufficient strength to withstand the pounding of the tube filling operation, which exerts a force of about 25 lbs. upon the tube, it is unsatisfactory, but the triple dip tube has proven to be satisfactory.

In the manner described hereinbefore there is provided a new and improved active material retaining tube designed specifically to preserve and utilize the strength inherent in glass. This is achieved by providing a braided tube in which the individual continuous monofilaments which make up the threads used in braiding the tubing are provided with a protective coating of resin which separates the glass filaments and bonds them to prevent their motion and thereby protects them from abrasion. The porosity of this tubing is controlled to provide optimum porosity with a minimum of active material loss by controlling the number of ends and picks in the tubing braid. The protective resin coating in addition to preserving the strength of the glass in the manner described stiffens the tube to the extent necessary to permit efficient handling during electrode manufacture.

Having completely described the present invention, that which is claimed as new is:

1. A method for making a porous, glass retaining tube for storage battery electrodes which comprises impregnating a braided glass tube with a concentrated phenol formaldehyde resin solution containing at least about 40% by weight of resin solids, passing said impregnated glass tubing through a pair of pressure rollers having a force of at least about 15 lbs. applied thereto to squeeze the excess resin solution from the tubing and to work the phenolic resin into the filaments comprising the glass threads, passing said impregnated glass tubing onto a forming mandrel to shape it to the contour of the mandrel, partially heat curing the phenolic resin while the tubing is on the mandrel to give it sufficient rigidity to retain its shape, removing the partially cured glass tubing from the mandrel and cutting the desired electrode retaining tube lengths therefrom, immersing the glass tube in a dilute phenolic resin solution containing from about 10 to about 15% by weight of resin solids for at least 5 seconds, allowing the excess resin solution to drain from the tube, partially heat curing the resin coated tube for about ⅓ to ½ the total time required for a complete cure, remove the partially cured glass tube from the oven and reimmerse the tube in a dilute phenolic resin solution containing from about 10 to about 15% by weight of resin solids for at least about 5 seconds, allowing the excess resin solution to drain from the tube and finally completely heat cure the thrice impregnated glass tube.

2. A method in accordance with claim 1 in which the impregnated glass tubing is passed through a series of staggered wiping bars prior to passing through said pressure rollers.

3. A method in accordance with claim 1 in which the concentrated phenolic resin solution contains about 54% by weight of phenolic resin solids.

4. A method in accordance with claim 1 in which the impregnated glass tube is further treated after the complete cure of the phenolic resin by coating both ends of the tube with a thermosetting resin so as to completely seal all pores.

References Cited by the Examiner

UNITED STATES PATENTS

| | | | |
|---|---|---|---|
| 2,594,836 | 3/1952 | Alexander | 264—137 |
| 2,852,424 | 9/1958 | Reinhart | 264—137 |
| 2,951,780 | 9/1960 | Bushman | 264—137 |
| 2,981,982 | 5/1961 | Pendorf | 264—134 |
| 2,995,781 | 8/1961 | Sipler | 264—137 |
| 3,063,887 | 11/1962 | Labino | 264—137 |
| 3,097,060 | 7/1963 | Sullivan | 264—137 |
| 3,131,725 | 5/1964 | Chyle | 138—140 |
| 3,143,147 | 8/1964 | Sellars et al. | 138—140 |
| 3,177,105 | 3/1965 | Wiltshire | 264—136 |
| 3,198,878 | 8/1965 | Kaczerginski | 264—137 |

ROBERT F. WHITE, *Primary Examiner.*

LAVERNE D. GEIGER, *Examiner.*

H. ARTIS, R. B. MOFFITT, *Assistant Examiners.*